US011424675B2

(12) United States Patent
Hajje et al.

(10) Patent No.: US 11,424,675 B2
(45) Date of Patent: Aug. 23, 2022

(54) DIELECTRIC ENERGY CONVERTER

(71) Applicant: Apparent Energy, Inc., Ashland, OR (US)

(72) Inventors: Hani Henri Hajje, Ashland, OR (US); Brett C. Belan, Ashland, OR (US); Adam Reed, Ashland, OR (US)

(73) Assignee: APPARENT ENERGY, INC., Ashland, OR (US)

( * ) Notice: Subject to any disclaimer, the term of this patent is extended or adjusted under 35 U.S.C. 154(b) by 0 days.

(21) Appl. No.: 17/110,984

(22) Filed: Dec. 3, 2020

(65) Prior Publication Data
US 2021/0119447 A1 Apr. 22, 2021

Related U.S. Application Data

(63) Continuation of application No. 15/410,536, filed on Jan. 19, 2017.

(60) Provisional application No. 62/296,725, filed on Feb. 18, 2016.

(51) Int. Cl.
*H02M 3/07* (2006.01)
*H02J 1/00* (2006.01)
*H02J 7/00* (2006.01)
*H02M 3/158* (2006.01)
*H02J 7/34* (2006.01)

(52) U.S. Cl.
CPC ............. *H02M 3/07* (2013.01); *H02J 1/00* (2013.01); *H02J 7/0068* (2013.01); *H02M 3/158* (2013.01); *H02J 7/345* (2013.01); *H02J 2207/20* (2020.01)

(58) Field of Classification Search
CPC ............ H02M 3/07; H02M 2003/071; H02M 2003/072; H02M 2007/4835
See application file for complete search history.

(56) References Cited

U.S. PATENT DOCUMENTS

| | | | |
|---|---|---|---|
| 5,132,895 A * | 7/1992 | Kase | H02M 3/07 363/60 |
| 5,581,454 A | 12/1996 | Collins | |
| 6,198,645 B1 | 3/2001 | Kotowski et al. | |
| 8,089,787 B2 | 1/2012 | Melse | |
| 2005/0052220 A1 | 3/2005 | Burgener et al. | |
| 2005/0088144 A1 | 4/2005 | Pacholok et al. | |
| 2007/0055462 A1 | 3/2007 | Mulligan et al. | |
| 2009/0326624 A1 | 12/2009 | Melse | |
| 2011/0032026 A1 | 2/2011 | Pelley | |
| 2012/0293254 A1* | 11/2012 | Liu | H02M 3/07 323/283 |
| 2013/0028300 A1 | 1/2013 | Alberth et al. | |
| 2014/0277215 A1* | 9/2014 | Gordon | H02M 3/07 607/2 |

(Continued)

*Primary Examiner* — Alex Torres-Rivera
(74) *Attorney, Agent, or Firm* — Davis Wright Tremaine LLP; George C. Rondeau, Jr.; Heather M. Colburn

(57) ABSTRACT

A circuit design for efficiently transferring significant levels of electrical power with non-inductive circuit elements. Power is transferred using synchronously-switched capacitive elements in such a way that both discharge from the power source and charge transferred to a load (and/or back to the power supply) are supplied as low duration, high-intensity current pulses. The synchronous power transfer alternates between connecting capacitive charge storage elements in parallel and in series so that both step-up and step-down topologies may be readily realized.

33 Claims, 12 Drawing Sheets

(56) References Cited

U.S. PATENT DOCUMENTS

2016/0094126 A1 3/2016 Liu et al.
2016/0233770 A1 8/2016 Arakawa et al.
2017/0338663 A1 11/2017 Wu et al.

* cited by examiner

DIELECTRIC ENERGY CONVERTER

CROSS REFERENCE TO RELATED APPLICATION(S)

This application claims the benefit of U.S. Provisional Application No. 62/296,725, filed on Feb. 18, 2016, which is incorporated herein by reference in its entirety.

BACKGROUND OF THE INVENTION

Field of the Invention

The present invention is directed generally to the field of electrical power transfer and management.

Description of the Related Art

There are a multitude of well-known techniques for conditioning power from an electrical source to most efficiently supply that power to a load. These are typically based on manipulating current and voltage to match load requirements. When the supply is in the form of alternating current ("AC"), a transformer might be used to transform a high voltage and low current into a lower voltage and higher current, or the converse. When the power source is in the form of direct current ("DC"), a preferred contemporary methodology converts the DC power to a high-frequency pulsed form, manipulates the voltage and current relationship using magnetic elements such as transformers or inductors, then converts the pulsed form back to direct current in a form more suitable to the application. The general terminology used to describe this type of circuit topology is switched-voltage conversion Another variation on the switched-voltage conversion methodology is to use capacitors to store energy, and electronic switches to transform that energy from one level of voltage and current to another. Such so-called switched-capacitor arrays are routinely used in low current circuit applications to multiply operating voltages and thereby produce the appropriate voltage to power a given circuit, but are seldom if ever seen in higher power applications.

Magnetic power conversion circuits are often complex, inefficient, and costly, especially when voltages need to be boosted from lower to higher levels. Switched-capacitor networks can do a good job of doubling or tripling input voltage, but have traditionally been limited to very low power applications due to limitations imposed by the commonly accepted switched-capacitor converter topologies.

Therefore, a need exists for devices configured to condition power received from a power source and supply the conditioned power back to the power source and/or to a load. Devices that avoid inductive elements and/or magnetic elements and/or are suitable for higher power applications are particular desirable. The present application provides these and other advantages as will be apparent from the following detailed description and accompanying figures.

BRIEF DESCRIPTION OF THE SEVERAL VIEWS OF THE DRAWING(S)

Like reference numerals have been used in the figures to identify like components.

DETAILED DESCRIPTION OF THE INVENTION

Overview

Figure 11:
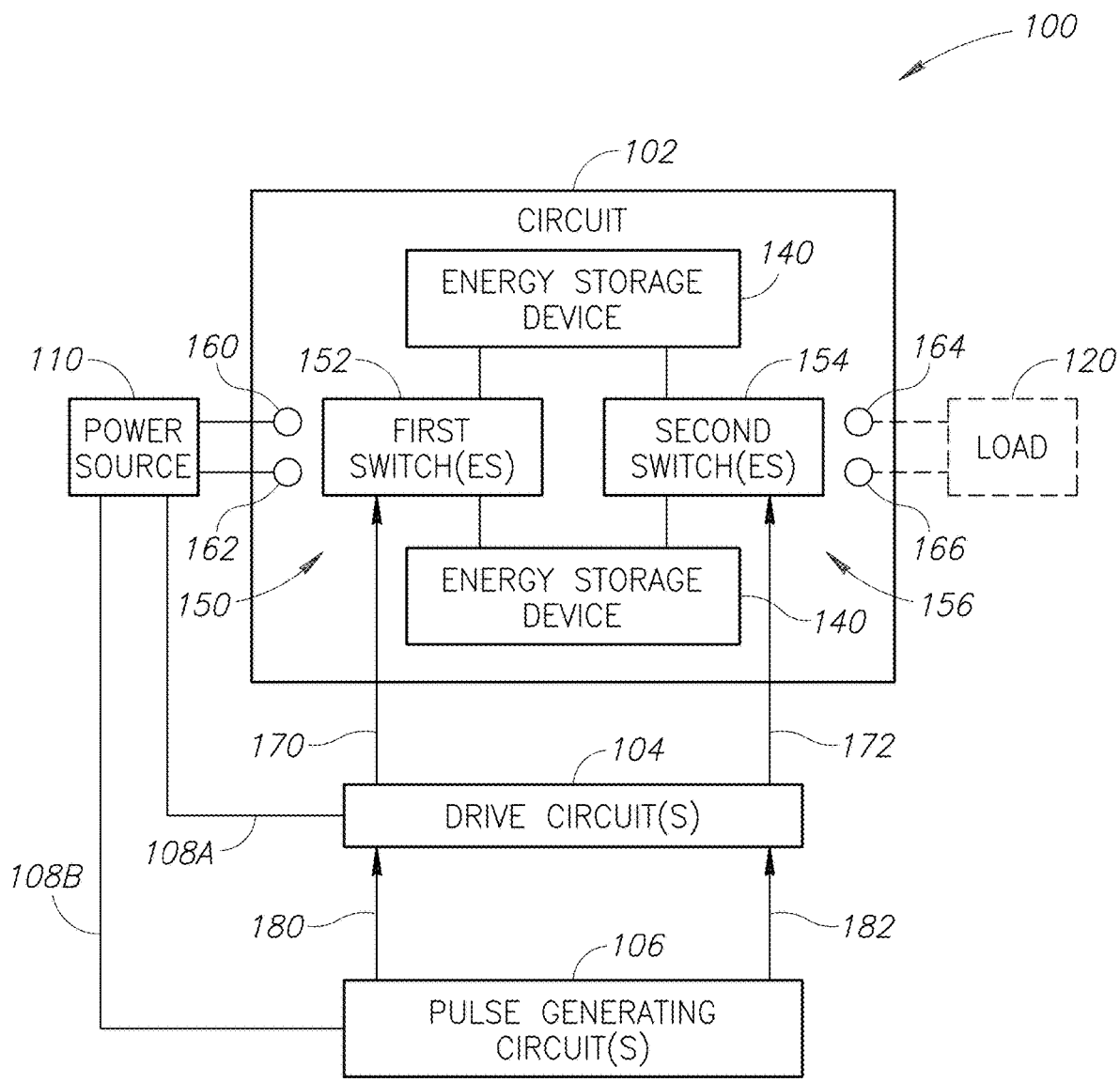
FIG. 11 is a block diagram illustrating an apparatus that may be used to implement a dielectric energy converter.

FIG. 11 illustrates an apparatus 100 that includes a circuit 102, one or more drive circuits 104, and one or more pulse generating circuits 106. The apparatus 100 may be characterized as being a dielectric energy converter. The circuit 102 has a unique switched-capacitor voltage converter topology that is capable of transforming significant levels of power received from a power source 110 to levels appropriate to be supplied to a wide range of loads (e.g., a load 120). For example, the power source 110 may be implemented as a power supply circuit configured to provide a range of input voltages (e.g., about 12 Volts to about 60 Volts) and/or supply a range of output voltages (e.g., about 12 Volts to about 60 Volts) to the load 120 and/or back to the power source 110. When the power source 110 is implemented as a battery 130 (see FIG. 8), this topology takes advantage of its intrinsic pulsed nature to provide improved battery performance and life. The power source 110 may be connected to the drive circuit(s) 104 (e.g., via a conductor 108A) and/or the pulse generating circuit(s) 106 (e.g., via a conductor 108B) and may provide power thereto.

As will be explained in detail below, the circuit 102 includes a plurality of energy storage devices 140 (e.g., capacitors C1 and C2 illustrated in FIG. 1) connected by conductors (e.g., wires, circuit traces, and the like) to a plurality of switching devices 150. Each of the energy storage devices 140 may be implemented as a capacitive element, a battery, and the like.

The switching devices 150 include one or more first switching devices 152 (e.g., switching elements Q1 and Q3 illustrated in FIG. 1) and one or more second switching devices 154 (e.g., a switching element Q2 illustrated in FIG. 1) arranged in a switching array 156 with the energy storage devices 140. By way of non-limiting examples, one or more of the switching devices 150 may each be implemented as a bipolar transistor, a metal-oxide-semiconductor field-effect transistor ("MOSFET"), an N Channel power MOSFET, a power MOSFET, a diode (e.g., a Shottky diode), and the like. As will be explained in detail below, when the circuit 102 is operating, the one or more first switching devices 152 are conducting (or 'On') when the one or more second switching devices 154 are not conducting (or 'On.' Similarly, when the one or more second switching devices 154 are 'On,' the one or more first switching devices 152 are 'Off.'

The circuit 102 also includes contacts 160 and 162 configured to be connected to the power source 110. Optionally, the circuit 102 may include contacts 164 and 166 configured to be connected to the optional load 120. As will be explained below, the circuit 102 may include a switching element Q4 (see FIGS. 4 and 6) positioned between the contact 160 and the remainder of the circuit 102 to isolate the power source 110 from the circuit 102. Similarly, the circuit 102 may include a switching element Q5 (see FIGS. 5 and 6) positioned between the contact 164 and the remainder of the circuit 102 to isolate the load 120 from the circuit 102 and/or the power source 110.

The circuit 102 receives first and second trigger signals 170 and 172 from the drive circuit(s) 104. By way of a non-limiting example, the drive circuit(s) 104 may be implemented as a pair of level shifting networks each like a level shifting network 290 illustrated in FIG. 3C. Returning to FIG. 11, the first trigger signal 170 is received (e.g., via one or more conductors) by the one or more first switching devices 152 and indicates whether the one or more first switching devices 152 are 'On' or 'Off.' Similarly, the second trigger signal 172 is received (e.g., via one or more conductors) by the one or more second switching devices 154 and indicates whether the one or more second switching devices 154 are "On" or "Off."

Each of the first and second trigger signals 170 and 172 may be implemented as a square wave, a sinusoid, and the like. In the embodiment illustrated, each of the first and second trigger signals 170 and 172 is a square wave with a series of pulses having a pulse width and a frequency. The pulse widths of the first and second trigger signals 170 and 172 are substantially equal to one another. Similarly, the frequencies of the first and second trigger signals 170 and 172 are substantially equal to one another.

Figure 2:
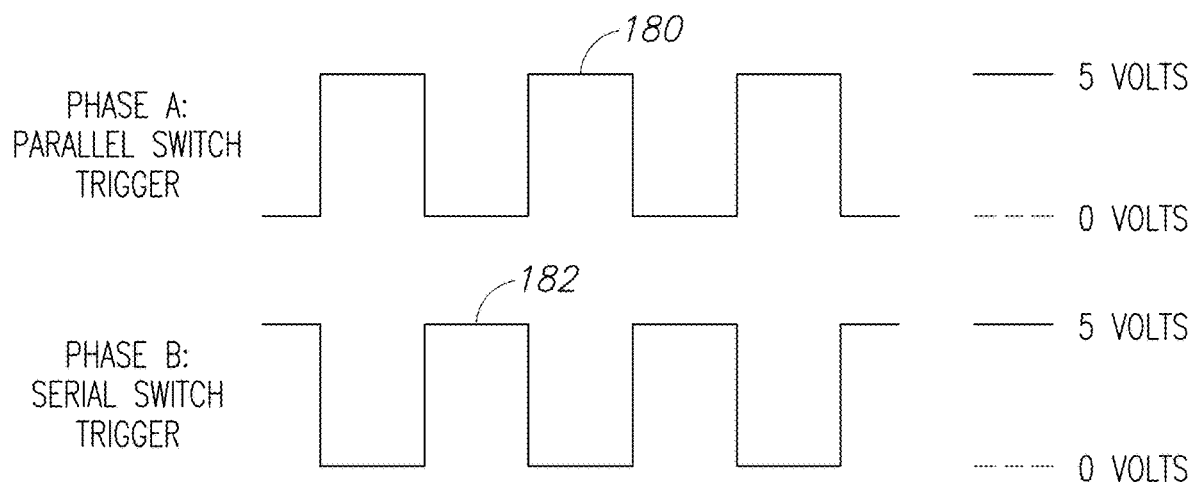
FIG. 2 illustrates a phase relationship between a pair of clock signals.
Figure 3A:
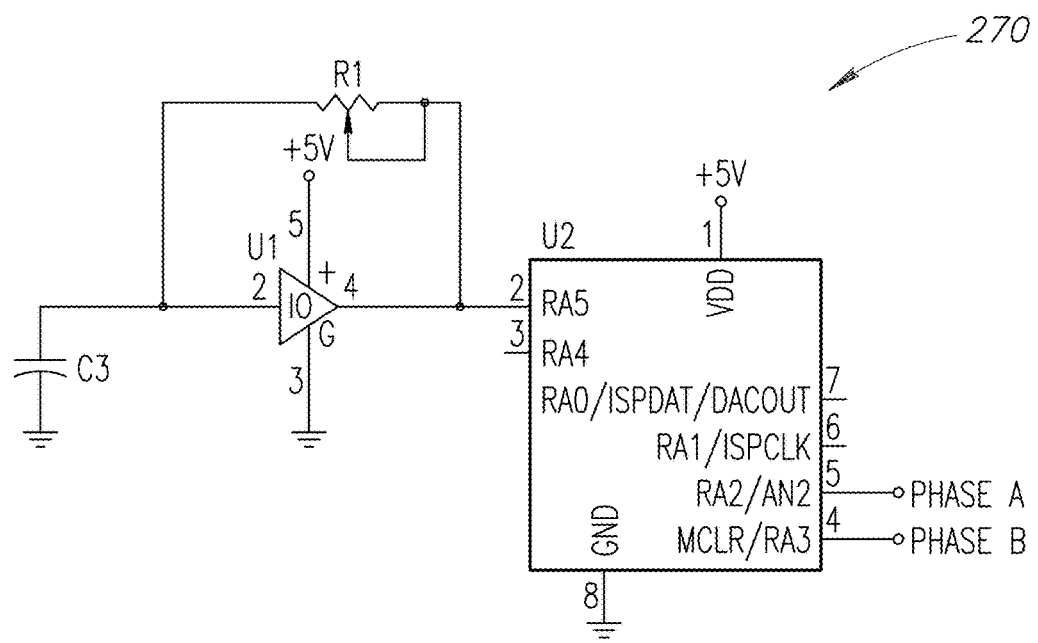
FIG. 3A is a circuit diagram of an analog clock generator circuit.
Figure 3B:
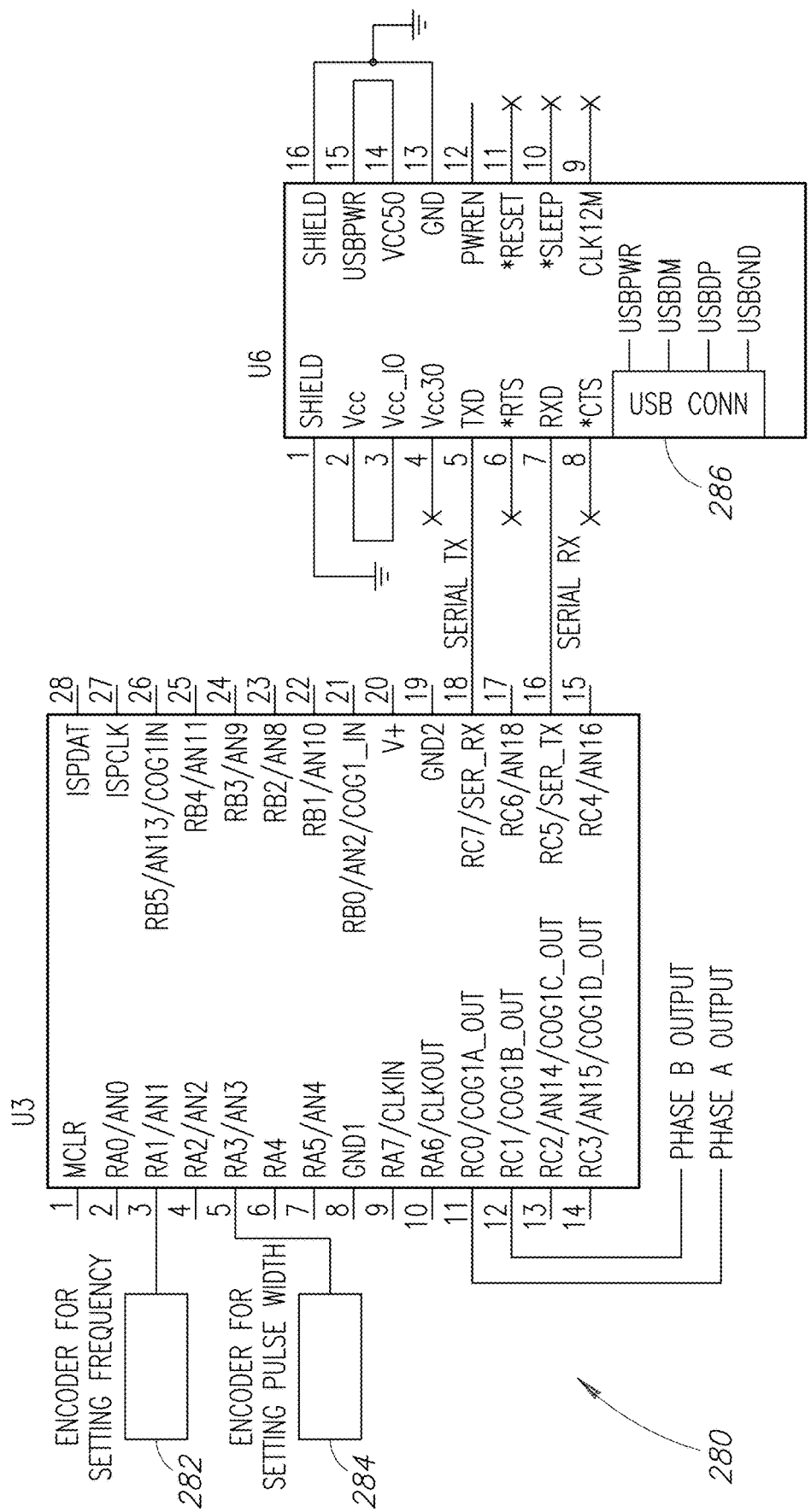
FIG. 3B is a circuit diagram of a digital clock generator circuit.

The first and second trigger signals 170 and 172 are generated based on the first and second clock signals 180 and 182 received from the pulse generating circuit(s) 106 (e.g., an analog clock generator circuit 270 illustrated in FIG. 3A, a digital clock generator circuit 280 illustrated in FIG. 3B, and the like). In the embodiment illustrated, the first trigger signal 170 is created from the first clock signal 180 and the second trigger signal 172 is created from the second clock signal 182. Thus, by modifying characteristics of the first and second clock signals 180 and 182, corresponding characteristics of the first and second trigger signals 170 and 172 may be modified. Each of the first and second clock signals 180 and 182 may be implemented as a square wave, a sinusoid, and the like. In the embodiment illustrated, each of the first and second clock signals 180 and 182 is a square wave with a series of pulses having a pulse width and a frequency. The pulse widths of the first and second clock signals 180 and 182 are substantially equal to one another. Similarly, the frequencies of the first and second clock signals 180 and 182 are substantially equal to one another. As shown in FIG. 2, the first and second clock signals 180 and 182 are synchronized and have phases (labeled "Phase A" and "Phase B," respectively) that are offset from one another by 180 degrees. Similarly, referring to FIG. 11, the first and second trigger signals 170 and 172 have phases that are offset from one another by 180 degrees.

The topology is configured to efficiently transfer significant amounts of energy (or electrical current) to the optional load 120 (and/or back to the power source 110), while offering great flexibility with regard to the transfer function itself. The pulse generating circuit(s) 106 may be implemented as a two-phase push-pull clock generator (e.g., the digital clock generator circuit 280 illustrated in FIG. 3B) that controls the transfer function in an alternating fashion such that the energy storage devices 140 (e.g., capacitors C1 and C2 illustrated in FIG. 1) are synchronously connected in series or parallel to the power source 110 and, optionally, to the load 120. Output power level is made continuously variable by varying the frequency and the pulse width of the first and second clock signals 180 and 182. By way of a non-limiting example, referring to FIG. 3B, the digital clock generator circuit 280 may include encoders 282 and 284 for controlling the frequency and the pulse width, respectively. Referring to FIG. 11, the frequency and/or the pulse width of the first and second clock signals 180 and 182 may be controlled by a digital communications protocol, such as RS-232 serial, Bluetooth protocol, and the like. Alternatively, the pulse generating circuit(s) 106 may be configured to provide the first and second clock signals 180 and 182 having a fixed frequency and a fixed pulse width.

By way of non-limiting examples, the circuit 102 may be implemented as a boost circuit (e.g., see FIGS. 1, 4-6, and 9) or a buck circuit (e.g., see FIGS. 7 and 10) with neither implementation including or requiring any magnetic circuitry elements.

Applications of this topology include battery charging and discharge management, battery conditioning, motor control, voltage regulation, and lighting control.

An inherent aspect of this topology is that distribution of energy is done in a pulsed manner. Batteries in particular show improvements in both charge and discharge performance when energy is transferred via a train of high current pulses of very short duration.

First Embodiment

Figure 1:
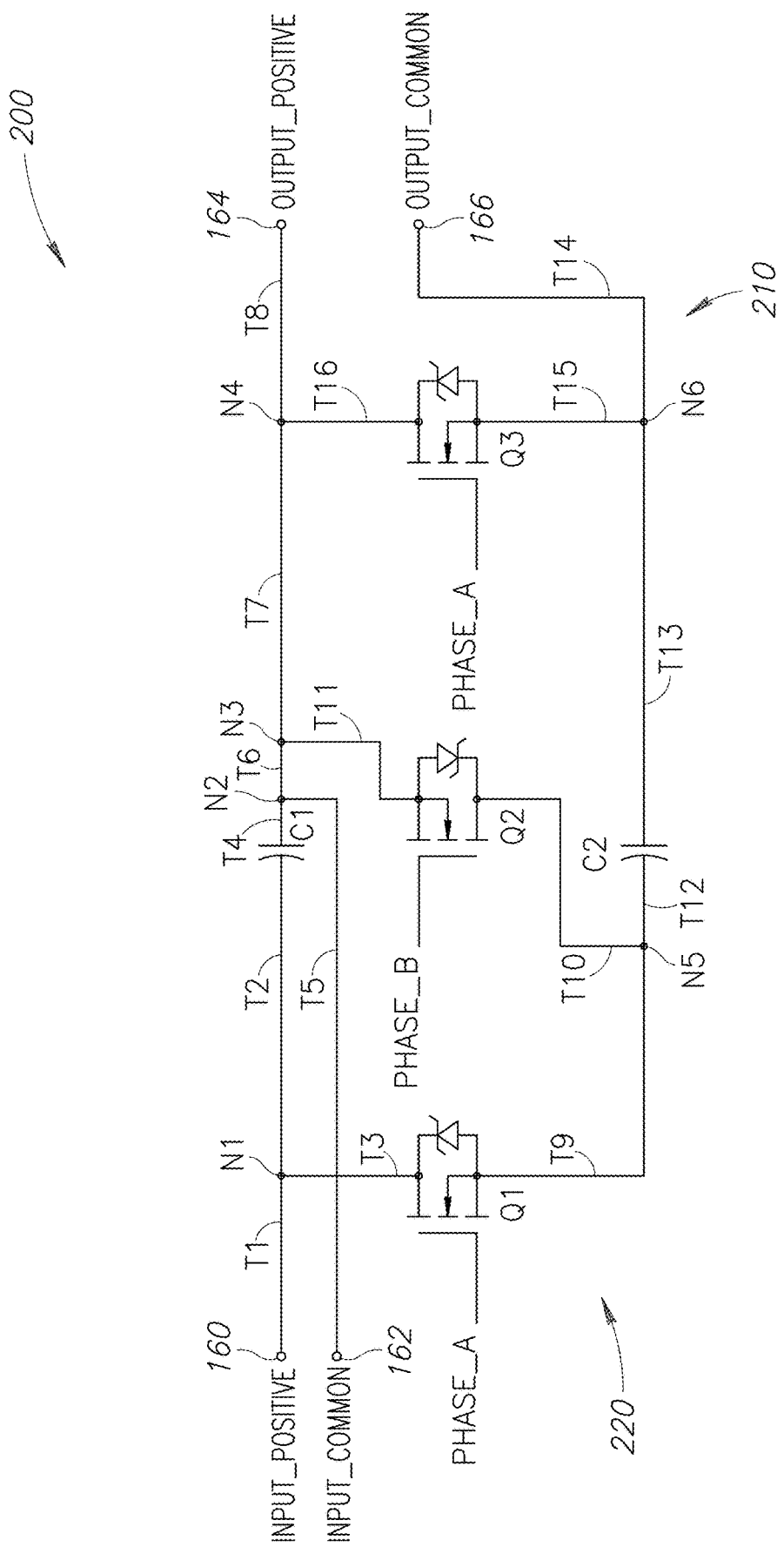
FIG. 1 is a circuit diagram of a first embodiment of a circuit that may be used to implement a dielectric energy converter.

FIG. 1 is a circuit diagram of a first embodiment of a circuit 200 that may be used to implement the circuit 102 (see FIG. 11). In this embodiment, the one or more first switching devices 152 (see FIG. 11) are implemented as the switching elements Q1 and Q3, and the one or more second switching devices 154 (see FIG. 11) are implemented as the switching element Q2. Thus, the switching array 156 (see FIG. 11) includes the switching elements Q1-Q3. The energy storage devices 140 are implemented as the capacitors C1 and C2. Together, the switching elements Q1-Q3 and the capacitors C1 and C2 may be characterized as forming a synchronous bi-phase switched-capacitor circuit array 210.

The power source 110 (see FIG. 11) may be connected to the circuit 200 at the contacts 160 and 162 (also labeled "INPUT_POSITIVE" and "INPUT_COMMON," respectively, in FIG. 1). The load 120 (see FIG. 11) may be connected to the circuit 200 at the contacts 164 and 166 (also labeled "OUTPUT_POSITIVE" and "OUTPUT_COMMON," respectively, in FIG. 1). Thus, in FIG. 1, the power source 110 (see FIG. 11) and the load 120 (see FIG. 11) are directly connected to the circuit 200. This results in the load 120 receiving a composite waveform that includes both power delivered directly from the power source 110 and power supplied by the capacitors C1 and C2 through at least a portion of the circuit 200.

In the circuit 200, the contact 160 is connected by a conductor T1 to a node N1. The node N1 is connected to the capacitor C1 and the switching element Q1 by conductors T2 and T3, respectively. The capacitor C1 is also connected to a node N2 by a conductor T4. The contact 162 is also connected to the node N2 by a conductor T5. The node N2 is connected to a node N3 by a conductor T6. The node N3 is connected to a node N4 by a conductor T7. The contact 164 is connected to the node N4 by a conductor T8. The switching element Q1 is connected to a node N5 by a conductor T9. The node N5 is connected to the switching element Q2 by a conductor T10. The switching element Q2 is connected to the node N3 by a conductor T11. The node N5 is connected to the capacitor C2 by a conductor T12. The capacitor C2 is connected to a node N6 by a conductor T13. The contact 166 is connected to the node N6 by a conductor T14. The node N6 is connected to the switching element Q3 by a conductor T15. The switching element Q3 is connected to the node N4 by a conductor T16. Thus, in the circuit 200, the power source 110 (see FIG. 11) is connectable across the capacitor C1 and the load 120 (see FIG. 11) is connectable across the switching element Q3.

As will be described below, how and where the contacts 160-166 connect to the remainder of the circuit 200 may be modified. Therefore, the circuit 200 may be characterized as including a core circuit module 220 that excludes the contacts 160-166 and any conductors (e.g., conductors T1, T5, T8, and T14) that connect the contacts 160-166 to the remainder of the circuit 200.

Referring to FIG. 1, the circuit 200 alternates between connecting capacitors C1 and C2 in parallel (referred to as a "parallel phase" or a "parallel state") and in series (referred to as a "serial phase" or a "serial state"). In this embodiment, the capacitors C1 and C2 charge during the parallel state and discharge during the serial state.

The switching elements Q1 and Q3 are driven by the first trigger signal 170 (see FIG. 11), which is labeled by its "Phase A" in FIG. 1. The switching element Q2 is driven by the second trigger signal 172 (see FIG. 11), which is labeled by its "Phase B" in FIG. 1. The switching elements Q1 and Q3 are "On" when an amplitude of the first trigger signal 170 (see FIG. 11) exceeds a first 'On' threshold. When "On," the switching elements Q1 and Q3 connect the capacitors C1 and C2 in parallel and the circuit 200 operates in the parallel state. The switching element Q2 is "On" when an amplitude of the second trigger signal 172 (see FIG. 11) exceeds a second 'On' threshold. When "On," the switching element Q2 connects the capacitors C1 and C2 in series and the circuit 200 operates in the serial state.

Referring to FIG. 11, the one or more pulse generating circuits 106 control a switch rate and a pulse width of each of the first and second trigger signals 170 and 172. By appropriately controlling the switch rate and the pulse width of the switching pulses of the first and second trigger signals 170 and 172, extremely high transfer efficiencies may be achieved, and significant power transfer levels are possible. Additionally, both the switching rate and the pulse width may be varied to regulate the power transfer ratio as desired. In practice, switching rates in the range from 100 Hz to 100 kHz have been shown to produce good coupling efficiency.

Figure 3C:
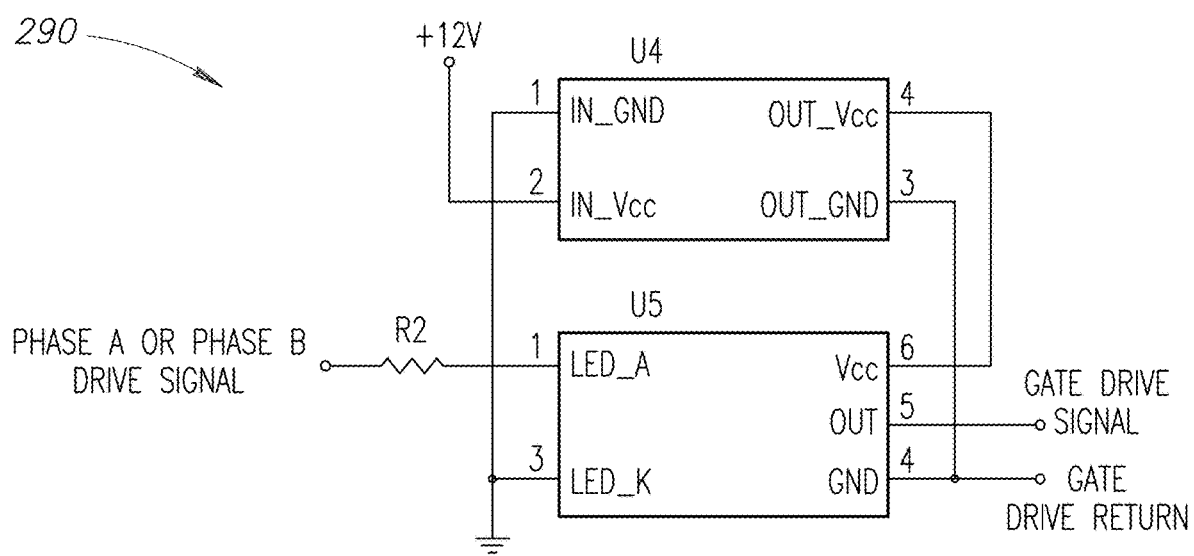
FIG. 3C is a circuit diagram of an exemplary isolated level shifting gate driver or level shifting network.

Referring to FIG. 1, it will be understood by those of ordinary skill in the art that the switching elements Q1-Q3 each require a separate, isolated gate drive signal (e.g., generated from the first and second clock signals 180 and 182 illustrated in FIG. 11). By way of a non-limiting example, one or more of the switching elements Q1-Q3 may each be implemented as an N Channel power MOSFET. In such embodiments, the switching elements Q1-Q3 each have a gate. The first trigger signal 170 delivered to the gates of the switching elements Q1 and Q3 must have a sufficient maximum amplitude (e.g., 5 volts) to exceed the first 'On' threshold. Similarly, the second trigger signal 172 delivered to the gate of the switching element Q2 must have a sufficient maximum amplitude (e.g., 5 volts) to exceed the second 'On' threshold. FIG. 3C is a circuit diagram of the level shifting network 290 configured to generate the first and second trigger signals 170 and 172). Referring to FIG. 11, the drive circuit(s) 104 may include a separate circuit like the level shifting network 290 (see FIG. 3C) for each of the first and second trigger signals 170 and 172. As shown in FIG. 3C, the level shifting network 290 may include a DC-DC-converter U4 (e.g., implemented as a 12V-12V isolated DC-DC converter, such as an NKE1212) connected to an opto isolator U5 (e.g., implemented as optocoupler, such as a TLP152).

Referring to FIG. 11, the pulse generating circuit(s) 106 may be characterized as being control circuitry. By way of non-limiting example, the power source 110 may be implemented as a power supply circuit configured to provide a wide range of input or output voltages (e.g., about 12 Volts to about 60 Volts), while holding the control circuitry at a constant voltage. The drive circuit(s) 104 isolate the first and second trigger signals 170 and 172 from the control circuitry. While powering the circuit 200, the power supply 110 may provide a constant voltage (e.g., via the conductor 108B) to the control circuitry.

FIG. 2 illustrates examples of typical clock signals that may be used to implement the first and second clock signals 180 and 182. In the simplest case, the first and second clock signals 180 and 182 are each a 50 percent duty cycle square wave and are offset from one another by 180 degrees of phase. In some embodiments, the pulse generating circuit(s) 106 allow adjustment of the pulse width.

By way of a non-limiting example, the first and second clock signals 180 and 182 may be generated by the analog clock generator circuit 270 illustrated in FIG. 3A or the digital clock generator circuit 280 illustrated in FIG. 3B. Referring to FIG. 3A, the analog clock generator circuit 270 may be characterized as being an analog biphase clock generator. In the analog clock generator circuit 270, an inverter U1 (e.g., a Schmitt inverter having a part number TC7S14), a capacitor C3, and a variable resistor R1 (e.g., a potentiometer) form a conventional square-wave oscillator. The values of both the capacitor C3 and the variable resistor R1 may be varied or modified to change the operating frequency. In the embodiment illustrated, the variable resistor R1 facilitates continuous adjustment of oscillator frequency. The analog clock generator circuit 270 includes a microcontroller U2 that generates a biphase drive signal. The inverter U1 drives the microcontroller U2. The microcontroller U2, in this example a PIC12F1822 eight-bit device, is programmed to provide two square wave outputs of opposing phase, namely, the first and second clock signals 180 and 182 (see FIG. 11). As with most drivers typical of this sort, a dead zone is programmed so that the two gate drive phases can never be in the 'high' state at the same time. The microcontroller U2 may be characterized as being a digital single-to-bi-phase converter that generates the first and second clock signals 180 and 182 (see FIG. 11), with each of the first and second clock signals 180 and 182 (see FIG. 11) having a constant 50 percent duty cycle. The first and second clock signals 180 and 182 (see FIG. 11) include first and second timing pulses, respectively, that may each be varied continuously over a range of approximately 100 Hz to approximately 100 kHz. The first and second clock signals 180 and 182 (see FIG. 11) may have first and second phases, respectively, offset by about 180 degrees.

Referring to FIG. 3B, the digital clock generator circuit 280 may be characterized as being a digital biphase clock generator. In this example a microcontroller U3 with a hardware-based complementary output generator, such as a PIC16F1617 part, generates a master clock frequency as well as generating a push-pull biphase pair of output signals, namely, the first and second clock signals 180 and 182 (see FIG. 11). The microcontroller U3 may be characterized as being a digital timing circuit that generates the first and second clock signals 180 and 182 (see FIG. 11) in a push-pull timing configuration in which the first pulse width is equal to the second pulse width. The microcontroller U3 may be configured to vary an operating frequency of the digital clock generator circuit 280 over a range of approximately 100 Hz to approximately 500 kHz, and to vary the first and second pulse widths over a duty cycle having a range from approximately 1 percent to approximately 100 percent.

As mentioned above, the frequency and/or the pulse width of the first and second clock signals 180 and 182 (see FIGS. 2 and 11) may be controlled by a digital communications protocol (e.g., RS-232 serial, Bluetooth protocol, and the like). In such embodiments, the digital clock generator circuit 280 may include an optional communications link U6 (e.g., an RS-232 communications link) connected to the microcontroller U2. The communications link U6 may include a communication connector 286 configured to be connected to another component and to receive digital communications therefrom. The communications link U6 communicates those digital communications to the microcontroller U2, which is configured to adjust the operating frequency and/or the pulse widths of the first and second clock signals 180 and 182 (see FIGS. 2 and 11) based at least in part on the digital communications. Thus, the digital communications protocol may be used to vary the operating frequency of the digital clock generator circuit 280 as well as the first and second pulse widths of the first and second clock signals 180 and 182, respectively (see FIG. 11). By way of non-limiting example, the communication connector 286 may be connected to an external microprocessor, a Personal Computer communications bus, or the like.

Referring to FIG. 11, there are a number of methodologies, included as part of this application, for interfacing the power source 110 and the load 120 with the core circuit module 220 (see FIG. 1). Each methodology has beneficial aspects appropriate to specific applications, as noted in the following descriptions of second, third, and fourth embodiments.

Second Embodiment

Figure 4:
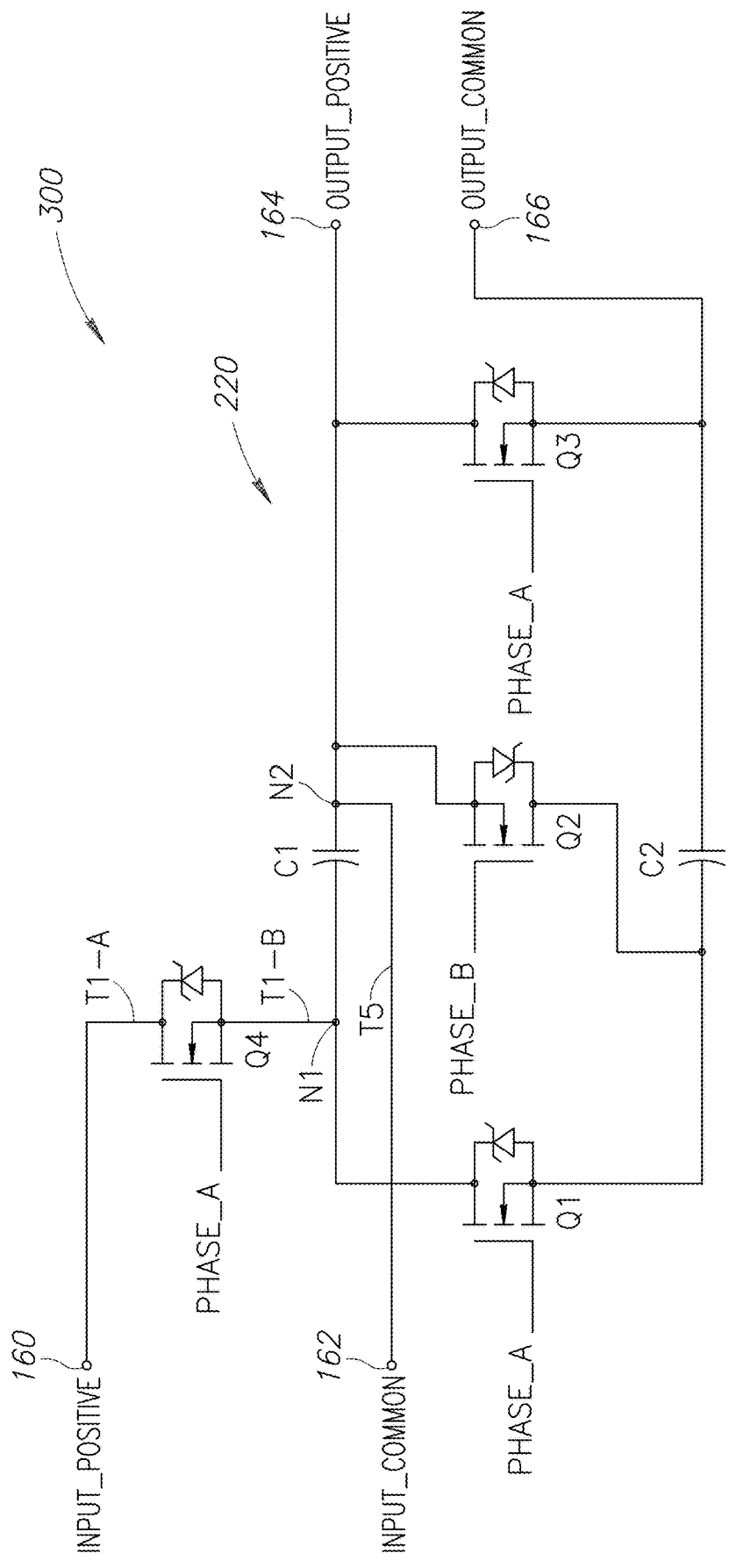
FIG. 4 is a circuit diagram of a second embodiment of a circuit including an input switch that isolates a power source from the remainder of the circuit.

FIG. 4 is a circuit diagram of the second embodiment of a circuit 300 that may be used to implement the circuit 102 (see FIG. 11). In the circuit 300, the power source 110 (see FIG. 11) is connected to the core circuit module 220 through a switching element Q4. The power source 110 (see FIG. 11) is connected to the contact 160, which is connected by a conductor T1-A to the switching element Q4. The switching element Q4 is connected by a conductor T1-B to the node N1. As in the circuit 200 (see FIG. 1), the contact 162 is connected to the node N2 by the conductor T5. The remainder of the circuit 300 is substantially identical to the circuit 200 (see FIG. 1).

By way of a non-limiting example, the switching element Q4 may be implemented as a power MOSFET or the equivalent. In this embodiment, the power source 110 (see FIG. 11) is isolated from the remainder of the circuit 300 (e.g., the core circuit module 220) by the switching element Q4.

The switching element Q4 receives and is controlled by the first trigger signal 170 (see FIG. 11), which is labeled by its "Phase A" in FIG. 4. Thus, the first trigger signal 170 controls, in a synchronous fashion, the switching elements Q1 and Q3 that when 'On,' connect the capacitors C1 and C2 in parallel, and the switching element Q4 that when 'On' connects the power source 110 (see FIG. 11) to the circuit 300. When the switching element Q4 is 'Off,' the power source 110 (see FIG. 11) is disconnected from the remainder of the circuit 300. In this embodiment, the power source 110 is connected to the core circuit module 220 during the parallel phase of clocked operation, and disconnected during the serial phase of clocked operation. The load 120 is always connected to the core circuit module 220, and thus receives current from the capacitors C1 and C2, whether the capacitors C1 and C2 are connected in series or parallel.

Third Embodiment

Figure 5:
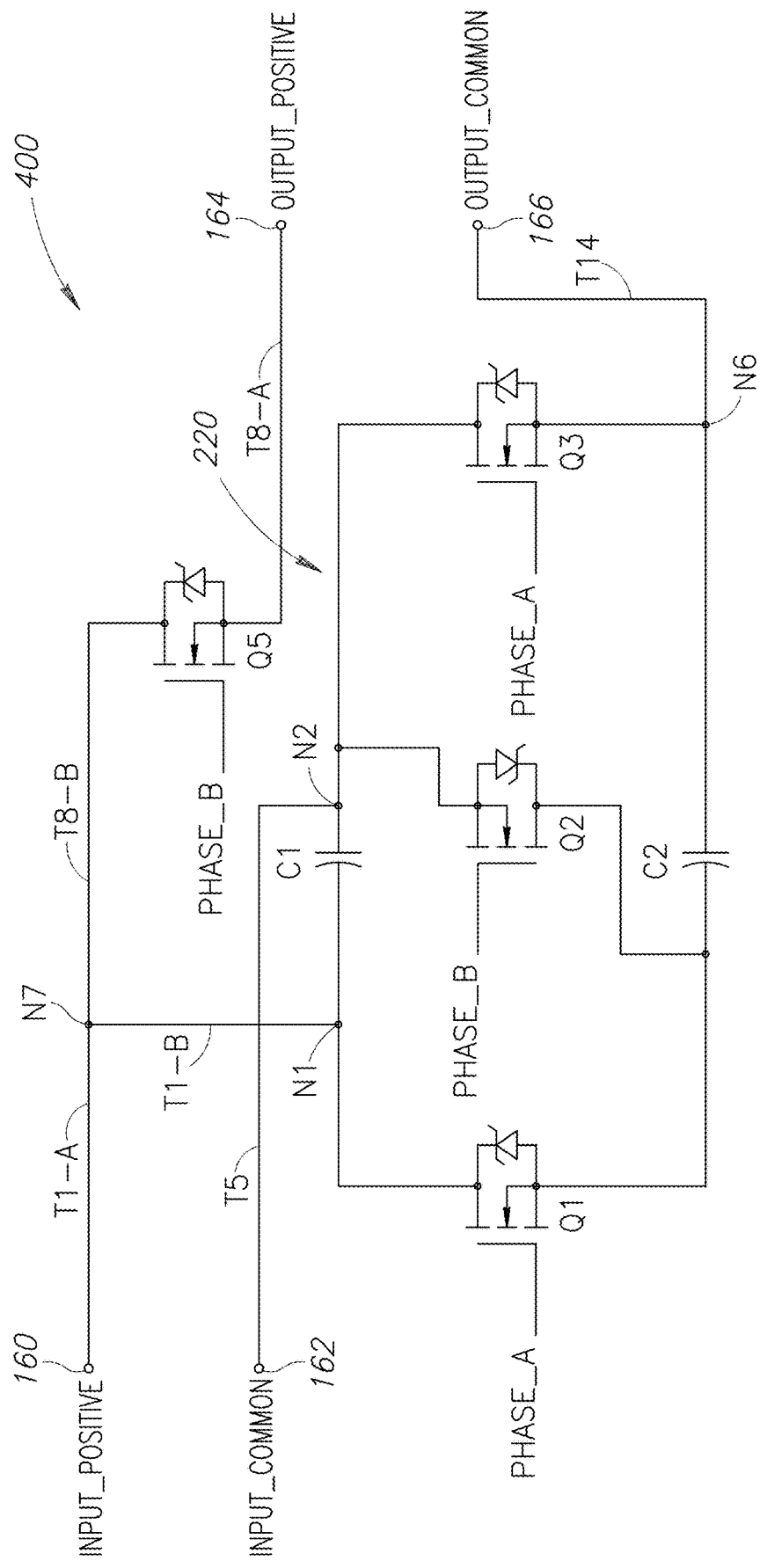
FIG. 5 is a circuit diagram of a third embodiment of a circuit including an output switch that isolates a load from the remainder of the circuit.

FIG. 5 is a circuit diagram of the third embodiment of a circuit 400 that may be used to implement the circuit 102 (see FIG. 11). In the circuit 400, the power source 110 (see FIG. 11) is connected directly to the core circuit module 220, and the load 120 (see FIG. 11) is connected through a switching element Q5. The power source 110 (see FIG. 11) is connected to the contact 160, which is connected by the conductor T1-A to a node N7. The node N7 is connected by the conductor T1-B to the node N1. The load 120 (see FIG. 11) is connected to the contact 164, which is connected by a conductor T8-A to the switching element Q5. The switching element Q5 is connected by a conductor T8-B to the node N7. The remainder of the circuit 400 is substantially identical to the circuit 200 (see FIG. 1).

In this embodiment, the load 120 (see FIG. 11) is isolated from both the remainder of the circuit 400 (e.g., the core circuit module 220) and the power source 110 by the switching element Q5. The switching element Q5 receives and is controlled by the second trigger signal 172 (see FIG. 11), which is labeled by its "Phase B" in FIG. 5. Thus, the second trigger signal 172 controls, in a synchronous fashion, the switching elements Q2 and Q5.

In this embodiment, the power source 110 (see FIG. 11) is always connected to the core circuit module 220, and the load 120 (see FIG. 11) is connected to the core circuit module 220 during the serial phase of clocked operation (during which the capacitors C1 and C2 are connected in series), and disconnected during the parallel phase (during which the capacitors C1 and C2 are connected in parallel) of clocked operation. In this embodiment, only the doubled supply voltage is delivered in pulse form to the load 120 (see FIG. 11).

Fourth Embodiment

Figure 6:
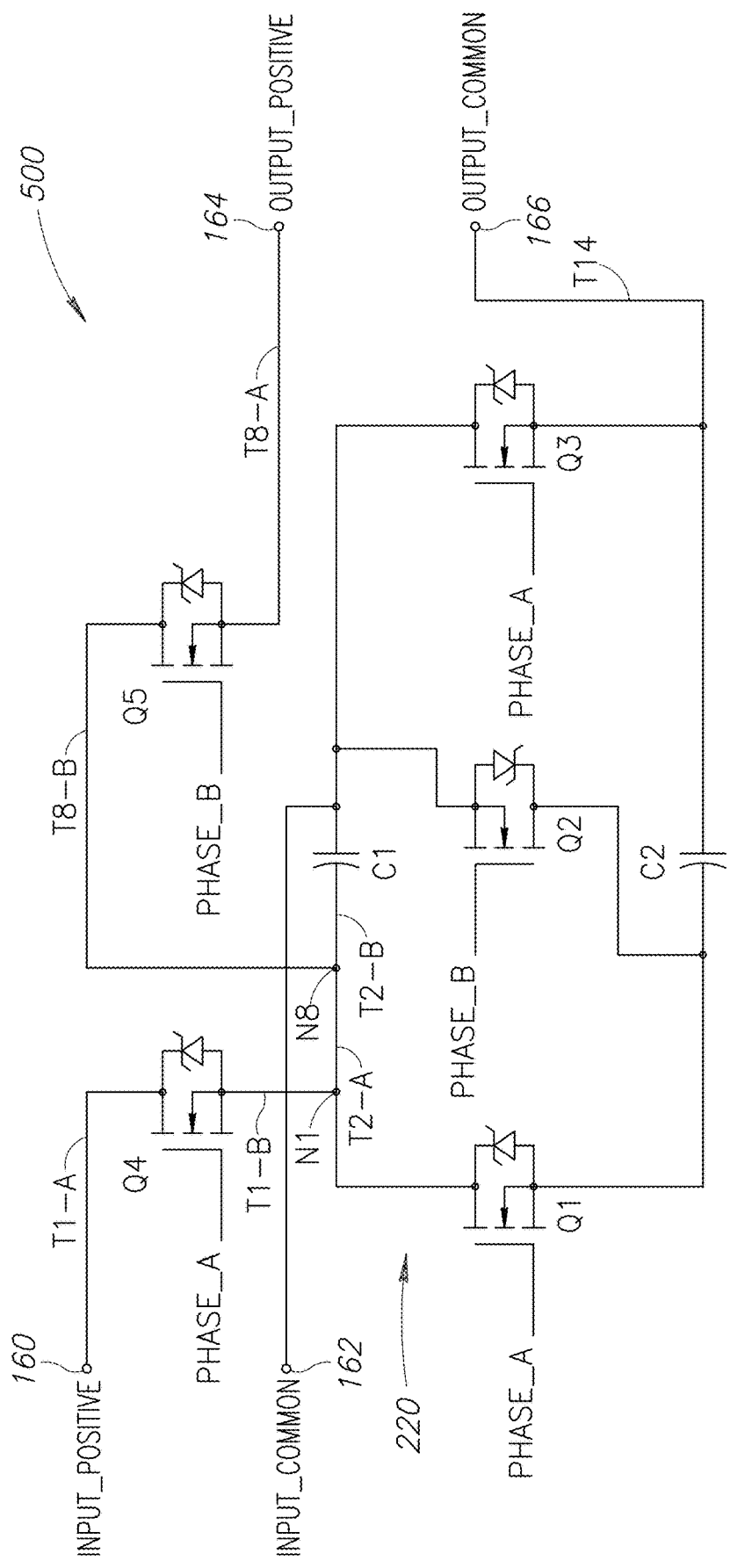
FIG. 6 is a circuit diagram of a fourth embodiment of a circuit that includes the input switch that isolates the power source from the remainder of the circuit and the output switch that isolates the load from the remainder of the circuit.

FIG. 6 is a circuit diagram of the fourth embodiment of a circuit 500 that may be used to implement the circuit 102 (see FIG. 11). In the circuit 500, the power source 110 (see FIG. 11) is connected to the core circuit module 220 through the switching element Q4 and the load 120 (see FIG. 11) is connected to the core circuit module 220 through the switching element Q5. The power source 110 (see FIG. 11) is connected to the contact 160, which is connected by the conductor T1-A to the switching element Q4. The switching element Q4 is connected by the conductor T1-B to the node N1. The load 120 (see FIG. 11) is connected to the contact 164, which is connected by the conductor T8-A to the switching element Q5. The switching element Q5 is connected by the conductor T8-B to a node N8. The node N1 is connected to the node N8 by a conductor T2-A and the node N8 is connected to the capacitor C1 by a conductor T2-B. The remainder of the circuit 500 is substantially identical to the circuit 200 (see FIG. 1). The two switching elements Q4 and Q5 are controlled by opposed phases of the clock generator circuit (the first and second trigger signals 170 and 172, respectively). In this embodiment, the power source 110 (see FIG. 11) and the load (see FIG. 11) are always isolated from one another.

Step-Up (Boost) Configuration

Referring to FIGS. 1 and 4-6, each of the circuits 200, 300, 400, and 500 has a step-up or boost configuration, which will now be described. The boost configuration may be configured to supply to the load 120 (see FIG. 11) a mathematical multiplication (e.g., a doubling, a tripling, a quadrupling, and the like) of an input voltage supplied by the power source 110 (see FIG. 11).

Referring to FIG. 11, the first and second trigger signals 170 and 172 may be characterized as having alternating maximum and minimum amplitudes. Because the first trigger signal 170 and the second trigger signal 172 have phases that are offset from one another by 180 degrees, when the first trigger signal 170 is at its maximum amplitude, the second trigger signal 172 is at its minimum amplitude, and vice versa.

Referring to FIG. 1, the maximum amplitude of the first trigger signal 170 (see FIG. 11) puts a positive voltage in excess of a first Gate-Source threshold voltage (e.g., the first 'On' threshold) on the gates of the switching elements Q1 and Q3, and places the switching elements Q1 and Q3 in the conducting, or 'ON' states. At the same time, the minimum amplitude of the second trigger signal 172, puts a voltage less than a second Gate-Source threshold voltage (e.g., the second 'On' threshold) on the gate of the switching element Q2. Thus, the gate of the switching element Q2 is held at a voltage below the second Gate-Source threshold voltage, which places the switching element Q2 in the non-conducting, or 'OFF' state. In this first clock-phase state (or the parallel state), the two capacitors C1 and C2 are connected in parallel, and the voltage of the power source 110 (e.g., a battery) is connected across both of the capacitors C1 and C2, causing them to be charged to the voltage of the power source 110 (e.g., the battery).

The maximum amplitude of the second trigger signal 172 (see FIG. 11) puts a positive voltage in excess of the second Gate-Source threshold voltage on the gate of the switching element Q2, and places the switching element Q2 in the conducting, or 'CON' state. At the same time, the minimum amplitude of the first trigger signal 170, puts a voltage less than the first Gate-Source threshold voltage on the gates of the switching elements Q1 and Q3. Thus, the gates of the switching elements Q1 and Q3 are held at a voltage below the first Gate-Source threshold voltage, which places the switching elements Q1 and Q3 in the non-conducting, or 'OFF' states. In this second clock-phase state (or the serial state), the two capacitors C1 and C2 are connected in series.

During the first clock phase state (or the parallel state) as described above, the capacitors C1 and C2 are charged in parallel. Thus, the voltage across each of the capacitors C1 and C2 is equal to the voltage of the power source 110 (see FIG. 11). The frequency and pulse width of the first and second trigger signals 170 and 172 and values of the storage capacitors C1 and C2 are selected so that the current charge takes the form of a short, high intensity pulse. For example, the capacitors C1 and C2 may each be a 1 microfarad capacitor when the core circuit module 220 is tuned for maximum transfer efficiency and the first and second trigger signals 170 and 172 are each in the range of 10 kHz to 12 kHz.

During the second clock phase state (or the serial state) as described above, the storage capacitors C1 and C2 charged during the first clock phase state are now connected in series to the load 120 (see FIG. 11). The voltage across the series-connected pair of capacitors C1 and C2, and therefore available to the load 120, is equal to twice the voltage of the power source 110 (e.g., a battery). This causes the capacitors C1 and C2 to discharge into the load 120 with a short, high intensity pulse similar in nature to the pulse created when the capacitors C1 and C2 were charged.

When the power source 110 is a storage battery (e.g., the battery 130 illustrated in FIG. 8), the boost configuration of the circuit 200 effectively increases effective storage capacity. Depending upon the frequency and the pulse width of the first and second trigger signals 170 and 172, the circuit 200 may increase output voltage over the entire discharge cycle. Alternatively, the circuit 200 may be adjusted to give a constant, perhaps even non-boosted output power while the battery 130 is in a relatively full state of charge. Then, as battery charge is depleted, the circuit 200 may continuously be readjusted to boost the diminishing battery voltage and thereby maintain the regulated output voltage for a longer period than is possible with conventional circuits.

Figure 9:
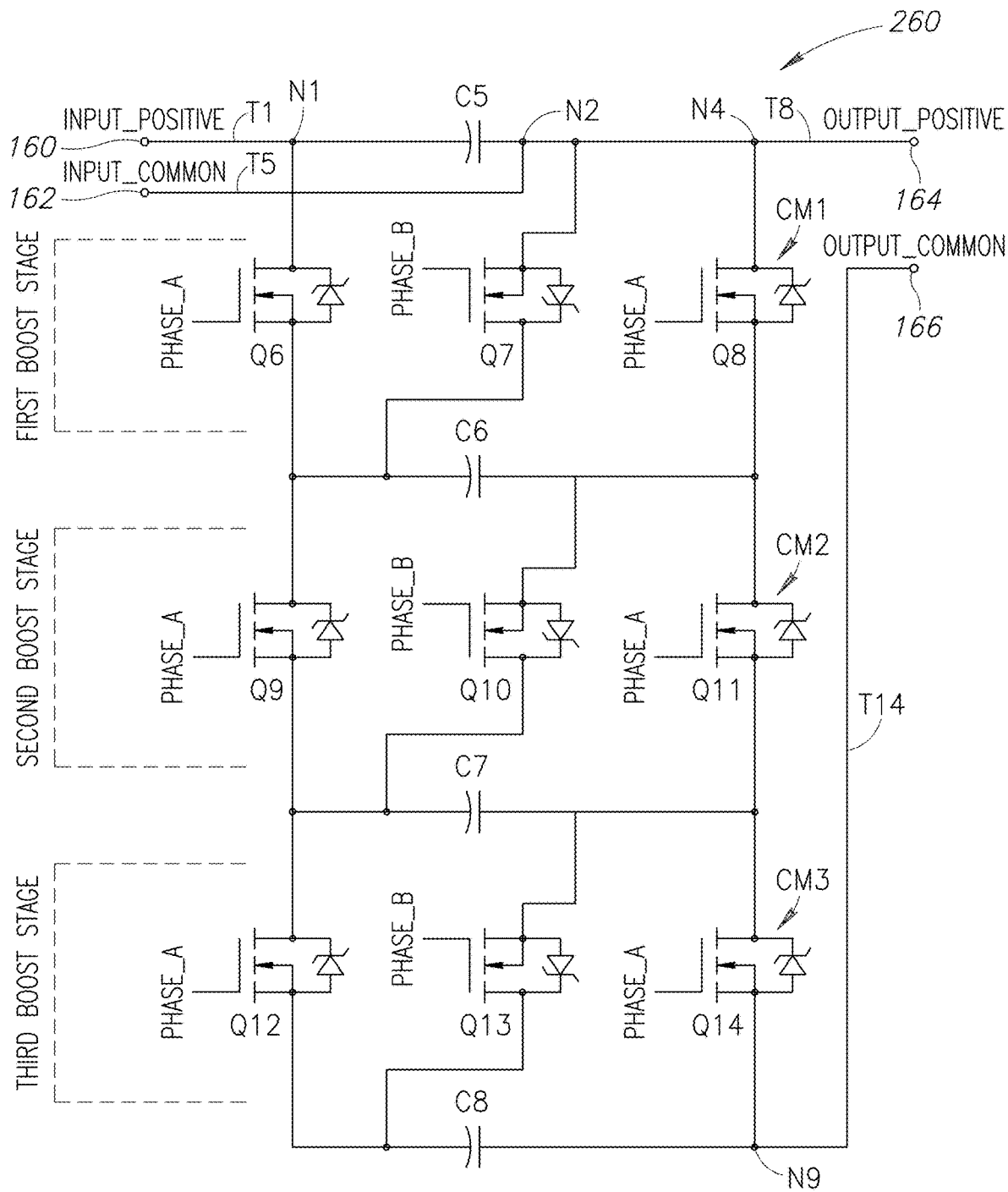
FIG. 9 is a circuit diagram of cascaded circuit modules configured to perform a Step-Up operation.

FIG. 9 illustrates a circuit or system 260. Referring to FIG. 9, if a greater level of boost conversion is required than can be achieved with the core circuit module 220 (see FIG. 1), one or more circuit modules (e.g., circuit modules CM2 and CM3) may be cascaded from a core circuit module CM1 like the core circuit module 220 (see FIG. 1). As shown in FIG. 9, the core circuit module CM1 includes capacitors C5 and C6 and switching elements Q6-Q8. The circuit module CM2 includes a capacitor C7 and switching elements Q9-Q11. The circuit module CM3 includes a capacitor C8 and switching elements Q12-Q14. Thus, each of the cascaded circuit modules CM2 and CM3 includes a storage capacitor (e.g., the capacitors C7 and C8, respectively) and three associated switching elements. However, as may be seen in FIG. 9, the circuit module CM2 is substantially identical to the core circuit module 220 (see FIG. 1) when the capacitor C6 is considered to be an element of the circuit module CM2. Similarly, the circuit module CM3 is substantially identical to the core circuit module 220 (see FIG. 1) when the capacitor C7 is considered to be an element of the circuit module CM3. The cascaded circuit modules CM2 and CM3 increase (e.g., double) energy transfer, with actual results depending upon the load 120 that is connected to the system 260.

In the embodiment illustrated, the power source 110 (see FIG. 11) is connected the contacts 160 and 162 and the load 120 (see FIG. 11) is connected the contacts 164 and 166. The contacts 160-164 are connected to the core circuit module CM1 in the same manner the contacts 160-164 are connected to the core circuit module 220 (see FIG. 1) of the circuit 200 (see FIG. 1). Specifically, the contact 160 is connected to the node N1 by the conductor T1, the contact 162 is connected to the node N2 by the conductor T5, and the contact 164 is connected to the node N4 by the conductor T8. However, unlike in the circuit 200 (see FIG. 1), the contact 166 is connected by the conductor T14 to a node N9 of the last circuit module CM3 (or boost stage). The node N9 is connected between the capacitor C8 and the switching element Q14.

Fifth Embodiment: Step-Down (Buck) Configuration

Figure 7:
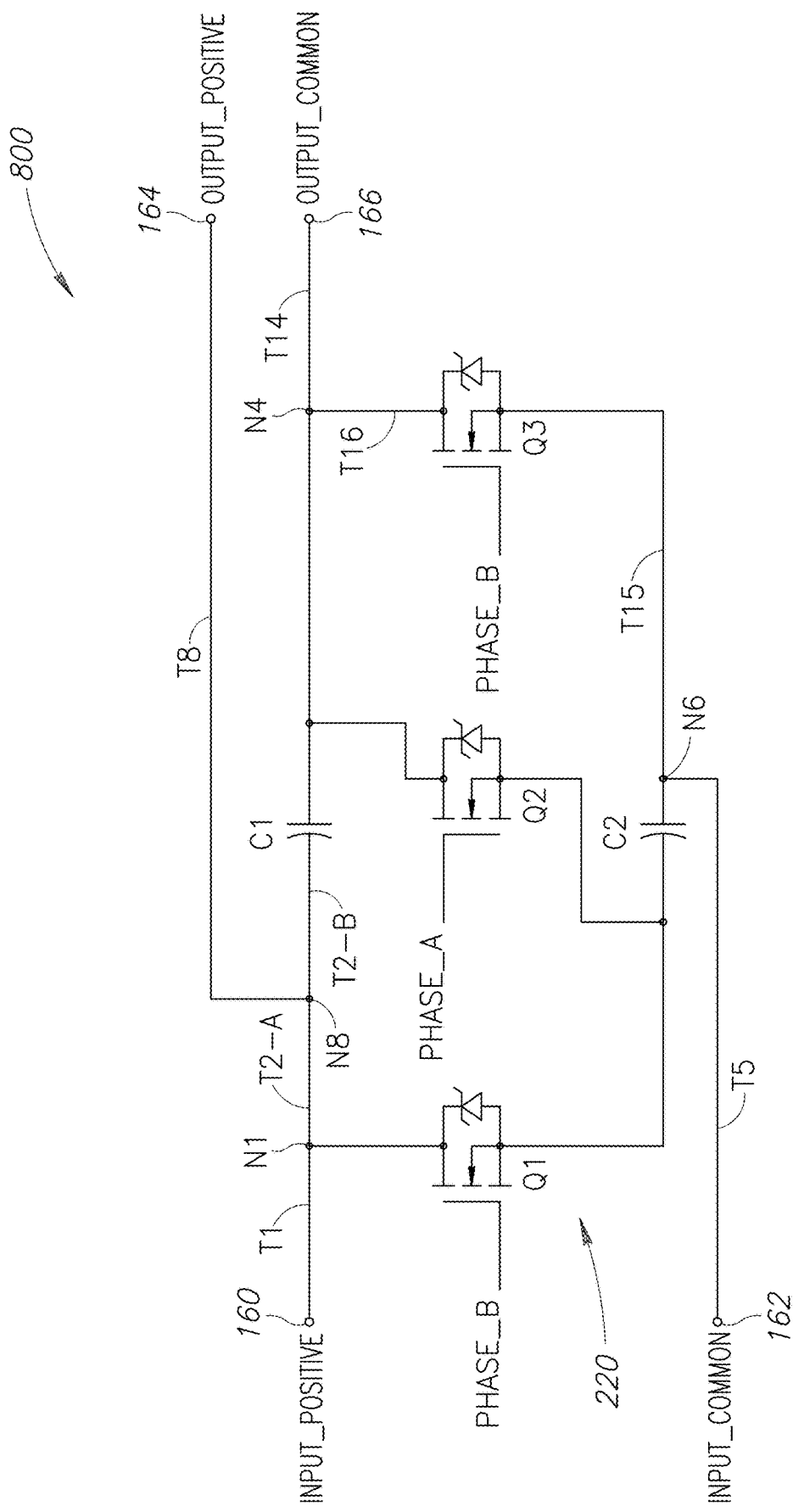
FIG. 7 is a circuit diagram of a fifth embodiment of a circuit configured to perform a Step-Down operation.

Referring to FIG. 7 operation of a circuit 800 in a step-down or buck configuration will now be described. The buck configuration may be configured to supply to the load 120 (see FIG. 11) a mathematical division (e.g., one-half, one third, one fourth, and the like) of an input voltage supplied by the power source 110 (see FIG. 11). The circuit 800 may be used to implement the circuit 102 (see FIG. 11). The power source 110 (see FIG. 11) is connected to the contacts 160 and 162. The contact 160 is connected by the conductor T1 to the node N1 and the contact 162 is connected by the conductor T5 to the node N6. The node N1 is connected by the conductor T2-A to the node N8. The node N8 is connected by the conductor T2-B to the capacitor C1. The load 120 (see FIG. 11) is connected to the contacts 164 and 166. The contact 164 is connected by the conductor T8 to the node N8 and the contact 166 is connected by the conductor T14 to the node N4. The remainder of the circuit 800 is substantially identical to the circuit 200 (see FIG. 1).

Unlike in the other embodiments, in this embodiment, referring to FIG. 11, the second trigger signal 172 (see FIG. 11) is delivered to the first switching device(s) 152 (e.g., switching elements Q1 and Q3 illustrated in FIG. 7) and the first trigger signal 170 (see FIG. 11) is delivered to the second switching device(s) 154 (e.g., switching element Q2 illustrated in FIG. 7). Referring to FIG. 7, in operation, the maximum amplitude of the first trigger signal 170 (see FIG. 11) puts a positive voltage in excess of the second Gate-Source threshold voltage on the gate of the switching element Q2, and places the switching element Q2 in the conducting, or 'ON' state. At the same time, the minimum amplitude of the second trigger signal 172 (see FIG. 11), puts a voltage less than the first Gate-Source threshold voltage on the gates of the switching elements Q1 and Q3. Thus, the gates of the switching elements Q1 and Q3 are held at a voltage below the first Gate-Source threshold voltage, placing the switching elements Q1 and Q3 in non-conducting, or 'OFF' states. In this first clock-phase state (or the serial state), the two capacitors C1 and C2 are connected in series, and the voltage of the power source 110 (e.g., the battery) is connected across both of the capacitors C1 and C2, causing each of the capacitors C1 and C2 to be charged to one-half of the voltage of the power source 110 (e.g., the battery).

The maximum amplitude of the second trigger signal 172 (see FIG. 11) puts a positive voltage in excess of the first Gate-Source threshold voltage on the gates of the switching elements Q1 and Q3, and places the switching elements Q1 and Q3 in conducting, or 'ON' states. At the same time, the minimum amplitude of the first trigger signal 170, puts a voltage less than a Gate-Source threshold voltage on the gate of the switching element Q2. Thus, the gate of the switching element Q2 is held at a voltage below the Gate-Source threshold voltage of the switching element Q2, placing it in the non-conducting, or 'OFF' state. In this second clock-phase state, the two capacitors C1 and C2 are connected in parallel, resulting in a voltage delivered to the load 120 of one-half of the voltage of the power source 110 (e.g., the battery).

Figure 10:
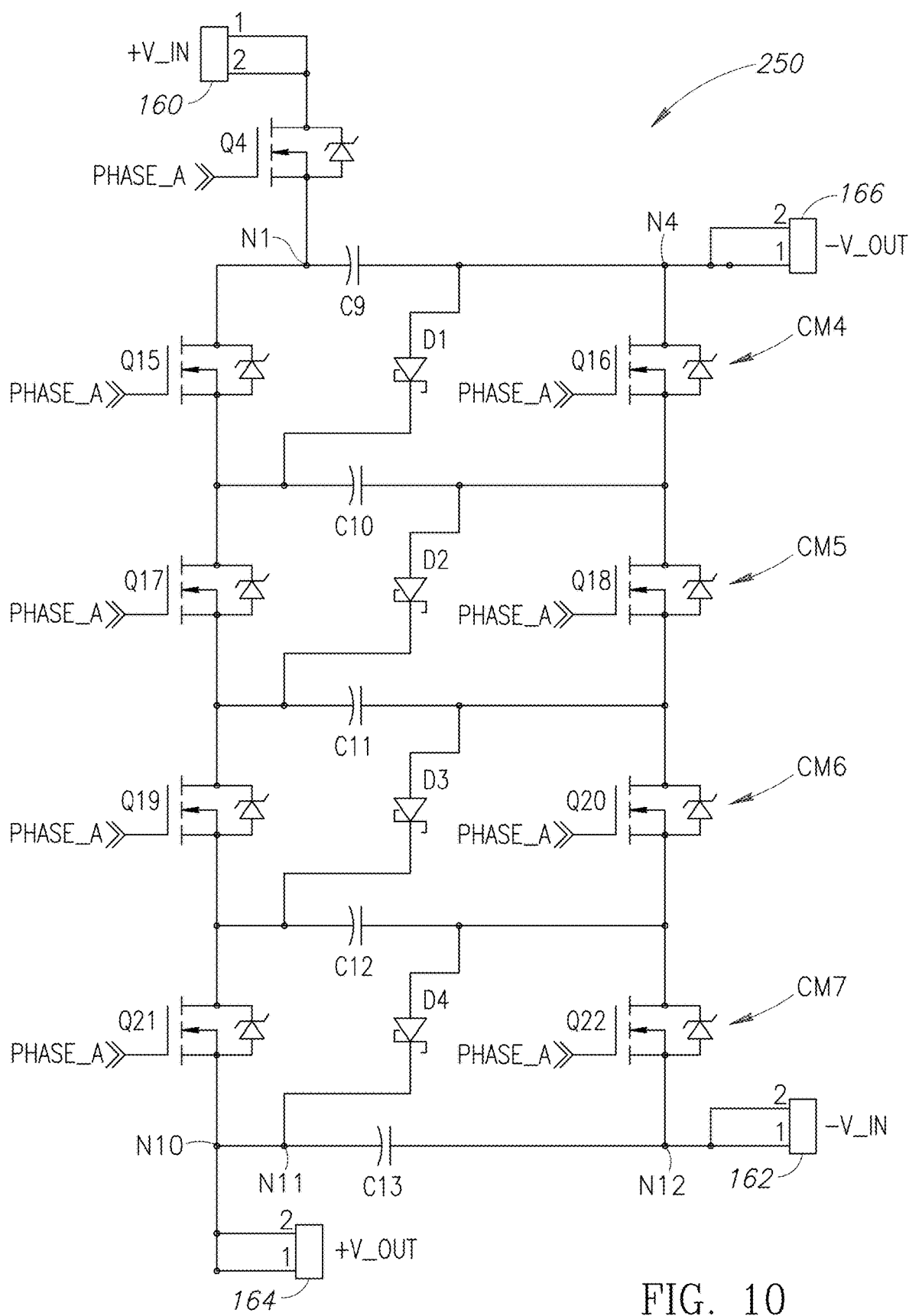
FIG. 10 is a circuit diagram of cascaded circuit modules configured to perform a Step-Down operation.

FIG. 10 illustrates a circuit or system 250. Referring to FIG. 10, if a greater level of buck conversion is required than can be achieved with the circuit 800 (see FIG. 7), one or more circuit modules (e.g., circuit modules CM5-CM7) may be cascaded from a core circuit module CM4. In the embodiment illustrated, the circuit modules CM4-CM7 each differ from the core circuit module 220 (see FIG. 1) because the second switching devices 154 (see FIG. 11) of the circuit modules CM4-CM7 have been implemented as diodes D1-D4 (e.g., Shottky diodes) instead of as switching elements each like the switching element Q2 (see FIG. 7).

As shown in FIG. 10, the core circuit module CM4 includes capacitors C9 and C10, switching elements Q15 and Q16, and the diode D1. The circuit module CM5 includes a capacitor C11, switching elements Q17 and Q18, and the diode D2. The circuit module CM6 includes a capacitor C12, switching elements Q19 and Q20, and the diode D3. The circuit module CM7 includes a capacitor C13, switching elements Q20 and Q21, and the diode D4. Thus, each of the cascaded circuit modules CM5-CM7 includes a storage capacitor (e.g., the capacitors C11-C13, respectively), two associated switching elements, and a diode. However, as may be seen in FIG. 10, the circuit module CM5 is substantially identical to the core circuit module CM4 when the capacitor C10 is considered to be an element of the circuit module CM5. Similarly, the circuit module CM6 is substantially identical to the core circuit module CM4 when the capacitor C11 is considered to be an element of the circuit module CM6 and the circuit module CM7 is substantially identical to the core circuit module CM4 when the capacitor C12 is considered to be an element of the circuit module CM7. The cascaded circuit modules CM5-CM7 decrease (e.g., by one-half) energy transfer, with actual results depending upon the load 120 that is connected to the system 260.

In the embodiment illustrated, the power source 110 (see FIG. 11) is connected the contacts 160 and 162 and the load 120 (see FIG. 11) is connected the contacts 164 and 166. The contacts 160 and 166 are connected to the core circuit module CM4 in the same manner the contacts 160 and 166 are connected to the core circuit module 220 (see FIG. 7) of the circuit 800 (see FIG. 7). Specifically, the contact 160 is connected to the node N1, and the contact 166 is connected to the node N4. However, unlike in the circuit 800 (see FIG. 7), the contact 164 is connected to a node N10 of the last circuit module CM7 (or buck stage). The node N10 is connected between the switching element Q21 and a node N11. The node N11 is connected between the node 10, the diode D4, and the capacitor C13. The contact 162 is connected to a node N12 of the last circuit module CM7 (or buck stage). The node N12 is connected between the capacitor C13 and the switching element Q22.

Sixth Embodiment: Battery Tender Configuration

Figure 8:
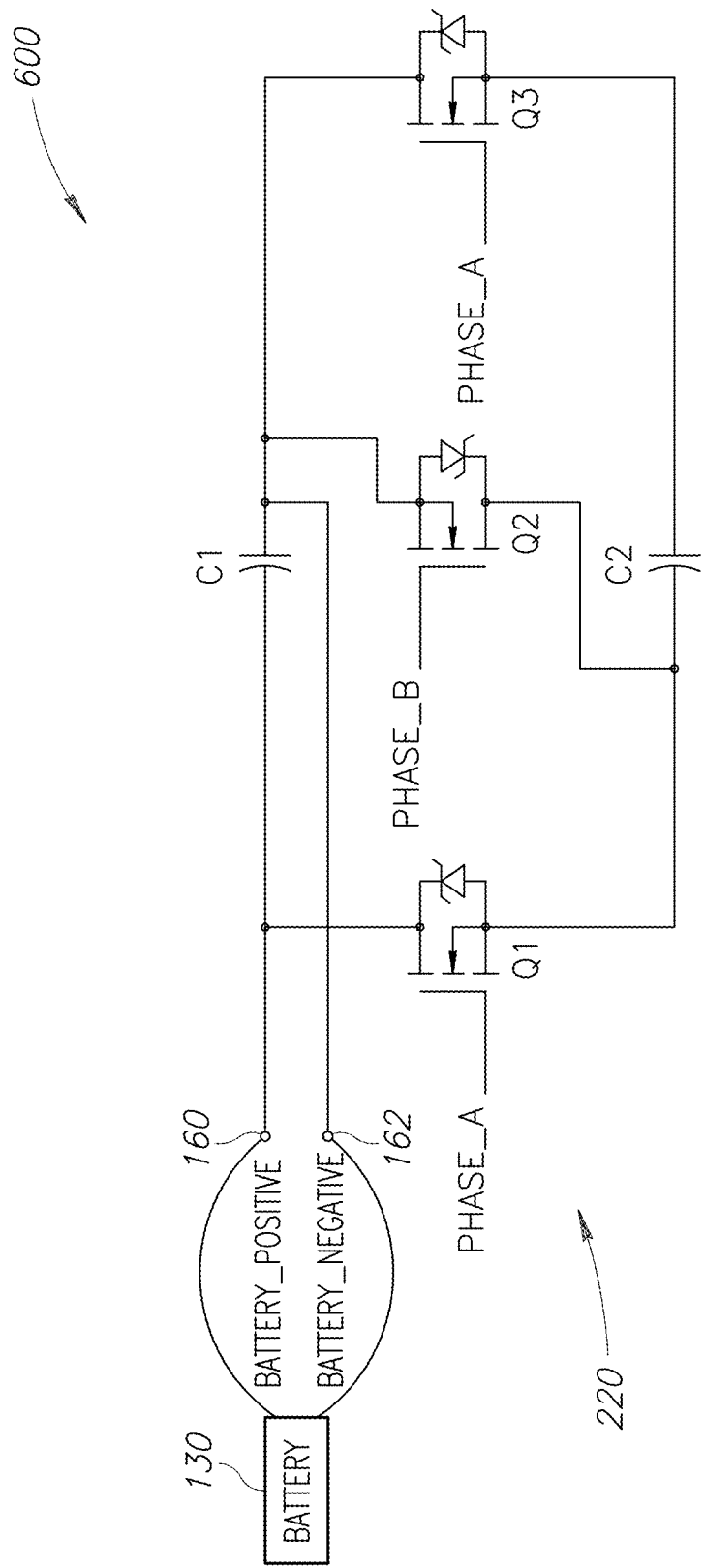
FIG. 8 is a circuit diagram of a sixth embodiment of a circuit configured for a battery tender application.

FIG. 8 is a circuit diagram of a sixth embodiment of a circuit 600 that may be used to implement the circuit 102 (see FIG. 11). In the circuit 600, the power source 110 (see FIG. 11) is the storage battery 130 (e.g., a rechargeable storage battery), connected directly to the core circuit module 220 as in the first embodiment illustrated in FIG. 1, but with no load connected. Thus, the circuit 600 is substantially identical to the circuit 200 (see FIG. 1) except the contacts 164 and 166 (see FIG. 1) and the conductors T8 and T14 (see FIG. 1) may be omitted. Referring to FIG. 8, the circuit 600 acts as a battery tender or conditioner.

The following sequence of events takes place in the circuit 600, governed, as before, by the two phases of the first and second trigger signals 170 and 172.

The maximum amplitude of the first trigger signal 170 (see FIG. 11) puts a positive voltage in excess of the first Gate-Source threshold voltage on the gates of the switching elements Q1 and Q3, and places the switching elements Q1 and Q3 in the conducting, or 'ON' states. At the same time, the minimum amplitude of the second trigger signal 172, puts a voltage less than the second Gate-Source threshold voltage on the gate of the switching element Q2. Thus, the gate of the switching element Q2 is held at a voltage below the Gate-Source threshold voltage of the switching element Q2, placing it in the non-conducting, or 'OFF' state. In this first clock-phase state (or parallel-capacitor charging state), the two capacitors C1 and C2 are connected in parallel, and the voltage of the power source 110 (e.g., the battery 130) is connected across both of the capacitors C1 and C2, causing them to be charged to the voltage of the power source 110.

The maximum amplitude of the second trigger signal 172 (see FIG. 11) puts a positive voltage in excess of the second Gate-Source threshold voltage on the gate of the switching element Q2, and places the switching element Q2 in the conducting, or 'ON' state. At the same time, the minimum amplitude of the first trigger signal 170, puts a voltage less than the first Gate-Source threshold voltage on the gates of the switching elements Q1 and Q3. Thus, the gates of the switching elements Q1 and Q3 are held at a voltage below the first Gate-Source threshold voltage, placing them in non-conducting, or 'OFF' states. In this second clock-phase state (or series-capacitor discharge state), the two capacitors C1 and C2 are connected in series.

With input and output nodes connected together in the circuit 600, current pulses drawn from the power source 110 (e.g., the battery 130) during the parallel-capacitor charging state and voltage-boosted pulses generated during the series-capacitor discharge state are both delivered to the power source 110 (e.g., the battery 130). If the current flow is observed using an oscilloscope and an appropriate current probe, it will be seen that during the parallel-capacitor charging state, current is drawn from the power source 110 in short, high-current pulses. On the other hand, during the series-capacitor discharge state, current pulses very similar in nature to those seen during the parallel-capacitor charging state will be observed moving in opposite polarity, sending current back to the power source 110. Thus, the circuit 600 both draws current from, and injects current into, the power source 110 (e.g., the battery 130), in a pulse form.

If the storage battery 130 is used as the power source 110 (see FIG. 11), this configuration is effective in countering the effects of battery self-discharge, and also works to counter the long term effects of neglecting to keep a battery in a charged state. To use a lead acid automotive starting battery as an example, open-circuit battery voltage self-discharge occurs at a rate of 3 percent per month to 20 percent per month, the actual value dependent upon storage temperature and other factors. Additionally, lead-acid batteries suffer from a condition known as sulfation. When lead-acid batteries are not properly and regularly charged, lead sulfate crystals build up on the negative plate, effectively reducing the surface area of the battery plate and thereby reducing battery capacity.

A compact, two-wire device can be manufactured in accord with the circuit 600, such that it can be mounted permanently to a single automotive lead-acid battery. The net power consumption of the circuit 600 is extremely low. Further, significant discharge-current pulses and charge-current pulses are observed in the current domain, such that a net sum of the opposing, and temporally-isolated, pulses is near zero.

Using fast, high current pulses to break up sulfation on a negative plate of a lead-acid battery is a technique well understood by those of ordinary skill in the art, and the principle is used in a number of commercially-available battery charger designs. But, every commercial implementation of pulsed anti-sulfation requires input of significant power in order to supply the energy applied in the form of pulsation. It is not necessary to inject additional power into the circuit 600, because the circuit 600 stores the battery's own energy, and feeds that energy back to the battery in pulses that effectively remedy the sulfation condition.

These same pulses feed back into the storage structure of a healthy battery, maintaining a baseline charge when the battery is not supplying power to the load 120, effectively reducing self-discharge rates. When the load 120 (see FIG. 11) is connected, the circuit 600 remains essentially invisible to the transfer of energy from the battery to the load 120.

Referring to FIGS. 1 and 4-10, each of the embodiments described above includes the core circuit module 220 (or the core circuit module CM1 in FIG. 10) that is connectable to the power source 110 (see FIG. 11) and, in some instances, the load 120 (see FIG. 11). The circuits 102, 200, 260, and 300-800 may be characterized as being synchronous, switched-capacitor power controllers. The components of the circuits 102, 200, 260, and 300-800 are non-inductive and non-magnetic. The core circuit module 220 includes the two capacitors C1 and C2, connected together within a switching matrix that includes switching elements Q1-Q3, plus any necessary supporting components (e.g., the nodes N1-N6 and at least some of the conductors T1-T16). The switching elements Q1-Q3 may be implemented as three N-Type power MOSFETs or similar power switching circuit elements. It will be understood by those of ordinary skill in the art, as shown in FIG. 10, that multiples of the core circuit module 220 (see FIG. 1) may be connected in a cascade fashion if increased power and/or voltage levels are desired. Referring to FIGS. 1 and 4-10, when operating, the circuits 102, 200, 260, and 300-800 alternate between series and parallel connections of capacitive elements (e.g., the capacitors C1 and C2 or the capacitors C5-C8). Referring to FIG. 11, the alternating nature of this connection is established by the drive circuit(s) 104 and the pulse generating circuit(s) 106 (which may be implemented as a two-phase clock circuit). The first and second trigger signals 170 and 172 function as controlling waveforms that control the switching elements (e.g., the switching elements Q1-Q14) in the circuits 102, 200, 260, and 300-800.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An electrical power conversion apparatus for use with a power source and a load, the power source providing an input voltage, the apparatus comprising:
    a plurality of energy storage devices comprising a first capacitor and a second capacitor, the first capacitor being connectable to the power source with the power source being connected across the first capacitor;
    a plurality of switching devices connected to the plurality of energy storage devices, the plurality of switching devices comprising at least one first switching device and at least one second switching device, the at least one first switching device comprising first and third switching devices, the at least one second switching device comprising a second switching device, the third switching device being connectable to the load with the load connected across the third switching device, the plurality of switching devices being arranged to connect the plurality of energy storage devices in parallel when the plurality of switching devices is in a first state in which the at least one first switching device is conducting electrical current and the at least one second switching device is not conducting electrical current, the plurality of switching devices being arranged to connect the plurality of energy storage devices in series when the plurality of switching devices is in a second state in which the at least one first switching device is not conducting electrical current and the at least one second switching device is conducting electrical current, the first switching device being electrically connected to the first capacitor and the second switching device, the third switching device being electrically connected to the second capacitor and the second switching device, the second switching device being electrically connected between the first capacitor and the third switching device, the second switching device being electrically connected between the first switching device and the second capacitor, the first and second capacitors being connected in parallel to the power source when the plurality of switching devices is in the first state, and the first and second capacitors being connected in series to the load when the plurality of switching devices is in the second state to thereby create a mathematical multiplication of the input voltage and cause the apparatus to act as a voltage boost converter; and
    at least one drive circuit connected to the plurality of switching devices, the at least one drive circuit providing trigger signals to the plurality of switching devices when the apparatus is operating, the trigger signals alternately placing the plurality of switching devices in the first state and in the second state.

2. The apparatus of claim 1, further comprising:
    a pulse generating circuit connected to the at least one drive circuit, the trigger signals being electrically isolated from the pulse generating circuit by the at least one drive circuit, the pulse generating circuit delivering synchronized first and second clock signals to the at least one drive circuit when the apparatus is operating, the at least one drive circuit generating the trigger signals based on the first and second clock signals when the apparatus is operating, the pulse generating circuit receiving power from the power source when the apparatus is operating, the power source providing a substantially constant voltage to the pulse generating circuit when the apparatus is operating.

3. The apparatus of claim 1, wherein each of one or more of the plurality of switching devices is a bipolar transistor or a metal oxide field effect transistor.

4. The apparatus of claim 1, further comprising:
    electrical components arranged to provide increased electrical isolation between the plurality of switching devices and at least one of the power source and the load.

5. The apparatus of claim 1, further comprising:
    a pulse generating circuit connected to the at least one drive circuit, the trigger signals being electrically isolated from the pulse generating circuit by the at least one drive circuit, the pulse generating circuit delivering synchronized first and second clock signals to the at least one drive circuit when the apparatus is operating, the at least one drive circuit generating the trigger signals based on the first and second clock signals when the apparatus is operating, the first clock signal comprising first timing pulses having a first phase, the second clock signal comprising second timing pulses having a second phase, the first and second phases being 180 degrees out of phase from another.

6. The apparatus of claim 5, wherein the pulse generating circuit has a digital single-to-bi-phase converter that generates the first and second clock signals, and each of the first and second clock signals have a constant 50 percent duty cycle.

7. The apparatus of claim 6, wherein the first timing pulses are varied continuously over a range of 100 Hz to 100 kHz, and the second timing pulses are varied continuously over the range of 100 Hz to 100 kHz.

8. The apparatus of claim 5, wherein the first timing pulses have a first pulse width, the second timing pulses have a second pulse width, and the pulse generating circuit has a digital timing circuit that generates the first and second clock signals in a push-pull timing configuration in which the first pulse width is equal to the second pulse width.

9. The apparatus of claim 8, wherein the digital timing circuit is configured to vary an operating frequency of the pulse generating circuit over a range of 100 Hz to 500 kHz, and to vary the first and second pulse widths over a duty cycle having a range from 1 percent to 100 percent.

10. The apparatus of claim 8, wherein the pulse generating circuit has an operating frequency, and the operating frequency and the first and second pulse widths are varied by a digital communications protocol.

11. The apparatus of claim 10, wherein the digital communications protocol is RS-232 serial or Bluetooth protocol.

12. The apparatus of claim 1, wherein the trigger signals comprise a first trigger signal and a second trigger signal, the first and second trigger signals have an operating frequency, the first trigger signal comprises first pulses having a first pulse width, the second trigger signal comprises second pulses having a second pulse width, and the apparatus further comprises one or more digital encoders configured to vary the operating frequency and the first and second pulse widths.

13. The apparatus of claim 1, wherein the trigger signals comprise a first trigger signal and a second trigger signal, the first and second trigger signals have an operating frequency, the first trigger signal comprises first pulses having a first pulse width, the second trigger signal comprises second pulses having a second pulse width, and the apparatus further comprises an electrical device connected to the at least one drive circuit, the electrical device delivering synchronized first and second signals to the at least one drive circuit when the apparatus is operating, the at least one drive circuit generating the first and second trigger signals based on the first and second signals, respectively, when the apparatus is operating, the operating frequency and the first and second pulse widths having been determined by the electrical device.

14. The apparatus of claim 1, further comprising:

a pulse generating circuit connected to the at least one drive circuit, the pulse generating circuit delivering clock signals to the at least one drive circuit when the apparatus is operating, the at least one drive circuit generating the trigger signals based on the clock signals.

15. The apparatus of claim 1, wherein each of the plurality of energy storage devices is a capacitor or a battery.

16. An electrical power conversion apparatus that is connectable to a rechargeable storage battery, the apparatus comprising:

at least one first drive circuit;

at least one second drive circuit;

at least one first switching device connected to the at least one first drive circuit, the at least one first drive circuit being configured to provide a first trigger signal to each of the at least one first switching device, the first trigger signal indicating whether the at least one first switching device is in a conducting state or a non-conducting state;

at least one second switching device connected to the at least one second drive circuit, the at least one second drive circuit being configured to provide a second trigger signal to each of the at least one second switching device, the second trigger signal indicating whether the at least one second switching device is in a conducting state or a non-conducting state, the second trigger signal being offset from the first trigger signal such that the at least one second switching device is in the conducting state when the at least one first switching device is in the non-conducting state, and vice versa; and a plurality of energy storage devices connected to the at least one first switching device and the at least one second switching device, the plurality of energy storage devices being connected in parallel when the at least one first switching device is in the conducting state and the at least one second switching device is in the non-conducting state, the plurality of energy storage devices being connected in series when the at least one first switching device is in the non-conducting state and the at least one second switching device is in the conducting state, wherein when the apparatus is connected to the rechargeable storage battery, the plurality of energy storage devices is connected to the rechargeable storage battery when the plurality of energy storage devices is connected in parallel and in series, alternating between a parallel connection and a series connection both draws current as electronic pulses from the rechargeable storage battery, and injects current as electronic pulses into the rechargeable storage battery.

17. The apparatus of claim 16, further comprising:

a pulse generating circuit isolated from the at least one first switching device by the at least one first drive circuit and isolated from the at least one second switching device by the at least one second drive circuit, the at least one first drive circuit receiving a first signal from the pulse generating circuit and producing the first trigger signal based thereupon when the apparatus is operating, the at least one second drive circuit receiving a second signal from the pulse generating circuit and producing the second trigger signal based thereupon when the apparatus is operating.

18. The apparatus of claim 17, wherein the first signal determines a frequency and a pulse width of the first trigger signal and the second signal determines a frequency and a pulse width of the second trigger signal.

19. The apparatus of claim 16 connected to a load and a power source, wherein the plurality of energy storage devices is connected to the power source when the plurality of energy storage devices is connected in series, the plurality of energy storage devices is connected to the load when the plurality of energy storage devices is connected in parallel, alternating between a parallel connection and a series connection decreasing an input voltage received from the power source and supplied to the load.

20. An electrical power conversion apparatus for use with a rechargeable storage battery, the apparatus comprising:
a plurality of energy storage devices comprising a first capacitor and a second capacitor, the first capacitor being connectable to the rechargeable storage battery with the rechargeable storage battery being connected across the first capacitor;
a plurality of switching devices connected to the plurality of energy storage devices, the plurality of switching devices comprising at least one first switching device and at least one second switching device, the at least one first switching device comprising first and third switching devices, the at least one second switching device comprising a second switching device, the plurality of switching devices being arranged to connect the plurality of energy storage devices in parallel when the plurality of switching devices is in a first state in which the at least one first switching device is conducting electrical current and the at least one second switching device is not conducting electrical current, the plurality of switching devices being arranged to connect the plurality of energy storage devices in series when the plurality of switching devices is in a second state in which the at least one first switching device is not conducting electrical current and the at least one second switching device is conducting electrical current, the first switching device being electrically connected to the first capacitor and the second switching device, the third switching device being electrically connected to the second capacitor and the second switching device, the second switching device being electrically connected between the first capacitor and the third switching device, the second switching device being electrically connected between the first switching device and the second capacitor, wherein, when the rechargeable storage battery is connected across the first capacitor, the first and second capacitors are connected in parallel to the rechargeable storage battery when the plurality of switching devices is in the first state, and the first and second capacitors are connected in series when the plurality of switching devices is in the second state to thereby cause the apparatus to both draw current from, and inject current into, the rechargeable storage battery, in a pulse form; and
at least one drive circuit connected to the plurality of switching devices, the at least one drive circuit providing trigger signals to the plurality of switching devices when the apparatus is operating, the trigger signals alternately placing the plurality of switching devices in the first state and in the second state.

21. The apparatus of claim 20 for use with a power source, a pulse generating circuit connected to the at least one drive circuit, the trigger signals being electrically isolated from the pulse generating circuit by the at least one drive circuit, the pulse generating circuit delivering synchronized first and second clock signals to the at least one drive circuit when the apparatus is operating, the at least one drive circuit generating the trigger signals based on the first and second clock signals when the apparatus is operating, the pulse generating circuit receiving power from the power source when the apparatus is operating, the power source providing a substantially constant voltage to the pulse generating circuit when the apparatus is operating.

22. The apparatus of claim 20, wherein each of one or more of the plurality of switching devices is a bipolar transistor or a metal oxide field effect transistor.

23. The apparatus of claim 20, further comprising:
a pulse generating circuit connected to the at least one drive circuit, the trigger signals being electrically isolated from the pulse generating circuit by the at least one drive circuit, the pulse generating circuit delivering synchronized first and second clock signals to the at least one drive circuit when the apparatus is operating, the at least one drive circuit generating the trigger signals based on the first and second clock signals when the apparatus is operating, the first clock signal comprising first timing pulses having a first phase, the second clock signal comprising second timing pulses having a second phase, the first and second phases being 180 degrees out of phase from another.

24. The apparatus of claim 23, wherein the pulse generating circuit has a digital single-to-bi-phase converter that generates the first and second clock signals, and
each of the first and second clock signals have a constant 50 percent duty cycle.

25. The apparatus of claim 24, wherein the first timing pulses are varied continuously over a range of 100 Hz to 100 kHz, and
the second timing pulses are varied continuously over the range of 100 Hz to 100 kHz.

26. The apparatus of claim 23, wherein the first timing pulses have a first pulse width,
the second timing pulses have a second pulse width,
the pulse generating circuit has a digital timing circuit that generates the first and second clock signals in a push-pull timing configuration in which the first pulse width is equal to the second pulse width.

27. The apparatus of claim 26, wherein the digital timing circuit is configured to vary an operating frequency of the pulse generating circuit over a range of 100 Hz to 500 kHz, and to vary the first and second pulse widths over a duty cycle having a range from 1 percent to 100 percent.

28. The apparatus of claim 26, wherein the pulse generating circuit has an operating frequency, and
the operating frequency and the first and second pulse widths are varied by a digital communications protocol.

29. The apparatus of claim 28, wherein the digital communications protocol is RS-232 serial or Bluetooth protocol.

30. The apparatus of claim 20, wherein the trigger signals comprise a first trigger signal and a second trigger signal,
the first and second trigger signals have an operating frequency,
the first trigger signal comprises first pulses having a first pulse width,
the second trigger signal comprises second pulses having a second pulse width, and
the apparatus further comprises one or more digital encoders configured to vary the operating frequency and the first and second pulse widths.

31. The apparatus of claim 20, wherein the trigger signals comprise a first trigger signal and a second trigger signal,
the first and second trigger signals have an operating frequency,
the first trigger signal comprises first pulses having a first pulse width,
the second trigger signal comprises second pulses having a second pulse width, and
the apparatus further comprises an electrical device connected to the at least one drive circuit, the electrical device delivering synchronized first and second signals to the at least one drive circuit when the apparatus is operating, the at least one drive circuit generating the first and second trigger signals based on the first and second signals, respectively, when the apparatus is operating, the operating frequency and the first and second pulse widths having been determined by the electrical device.

32. The apparatus of claim 20, further comprising:
a pulse generating circuit connected to the at least one drive circuit, the pulse generating circuit delivering clock signals to the at least one drive circuit when the apparatus is operating, the at least one drive circuit generating the trigger signals based on the clock signals.

33. The apparatus of claim 20, wherein each of the plurality of energy storage devices is a capacitor or a battery.

* * * * *